(12) United States Patent
Scheuerell et al.

(10) Patent No.: US 11,400,969 B2
(45) Date of Patent: Aug. 2, 2022

(54) CENTER TAKE OFF RACK AND PINION STEERING SYSTEM

(71) Applicant: Polaris Industries Inc., Medina, MN (US)

(72) Inventors: Alex R. Scheuerell, Wyoming, MN (US); Timothy J. Giese, White Bear Lake, MN (US); Matthew S. Taylor, Riverside, CA (US)

(73) Assignee: Polaris Industries Inc., Medina, MN (US)

( * ) Notice: Subject to any disclaimer, the term of this patent is extended or adjusted under 35 U.S.C. 154(b) by 944 days.

(21) Appl. No.: 16/174,419

(22) Filed: Oct. 30, 2018

(65) Prior Publication Data

US 2019/0126969 A1    May 2, 2019

Related U.S. Application Data

(60) Provisional application No. 62/578,894, filed on Oct. 30, 2017.

(51) Int. Cl.
| | |
|---|---|
| *B62D 3/12* | (2006.01) |
| *F16H 19/04* | (2006.01) |
| *B62D 7/16* | (2006.01) |
| *F16H 57/12* | (2006.01) |
| *B62D 7/10* | (2006.01) |

(52) U.S. Cl.
CPC ............. *B62D 3/12* (2013.01); *B62D 7/16* (2013.01); *F16H 19/04* (2013.01); *B62D 3/123* (2013.01); *B62D 7/10* (2013.01); *F16H 57/12* (2013.01)

(58) Field of Classification Search
CPC .. B62D 3/12; B62D 7/16; B62D 3/123; B62D 7/10; F16H 19/04; F16H 57/12
See application file for complete search history.

(56) References Cited

U.S. PATENT DOCUMENTS

| | | | |
|---|---|---|---|
| 3,605,933 A * | 9/1971 | Millard | B62D 5/22 |
| | | | 180/428 |
| 4,819,499 A | 4/1989 | Morell | |
| (Continued) | | | |

FOREIGN PATENT DOCUMENTS

WO    WO 2019/089379    9/2019

OTHER PUBLICATIONS

International Search Report and Written Opinion issued by the European Patent Office, dated Feb. 11, 2019, for International Patent Application No. PCT/US2018/057745; 8 pages.

(Continued)

*Primary Examiner* — Victor L Macarthur
(74) *Attorney, Agent, or Firm* — Faegre Drinker Biddle & Reath LLP

(57) ABSTRACT

A center take off rack and pinion steering system is disclosed having a rack housing which houses a rack gear having first and second ends extending through the housing. A pinion gear is coupled to the rack gear to input steering power to the rack gear. A rack yoke is coupled to, and extends between, the first and second ends of the rack gear. A yoke support is coupled to the rack housing and a yoke support slider is coupled to the rack yoke and is movable with the rack yoke relative to the yoke support. Tie rod end mounts are supported by the rack yoke, the tie rod end mounts positioned laterally intermediate the first and second ends of the rack gear.

17 Claims, 5 Drawing Sheets

(56) References Cited

U.S. PATENT DOCUMENTS

| | | | | |
|---|---|---|---|---|
| 6,039,334 A * | 3/2000 | Ozeki | ................... | B62D 5/22 |
| | | | | 280/93.514 |
| 6,070,891 A * | 6/2000 | Knautz | ................. | B62D 3/12 |
| | | | | 280/93.503 |
| 8,122,993 B2 | 2/2012 | Ripley | | |
| 8,827,019 B2 | 9/2014 | Deckard | | |
| 9,193,377 B2 * | 11/2015 | Pavuk | ................... | B62D 3/12 |
| 9,283,985 B2 * | 3/2016 | Schroeder | ............ | B62D 7/16 |
| 9,623,912 B2 | 4/2017 | Schlangen | | |
| 2006/0043690 A1 * | 3/2006 | Pankau | ................. | B62D 3/12 |
| | | | | 280/93.502 |
| 2006/0272883 A1 | 12/2006 | Shin | | |
| 2010/0289238 A1 | 11/2010 | Archer | | |
| 2015/0197273 A1 | 7/2015 | Schroeder | | |

OTHER PUBLICATIONS

International Preliminary Report on Patentability issued by the International Preliminary Examining Authority, dated Dec. 16, 2019, for International Patent Application No. PCT/US2018/057745; 22 pages.

* cited by examiner

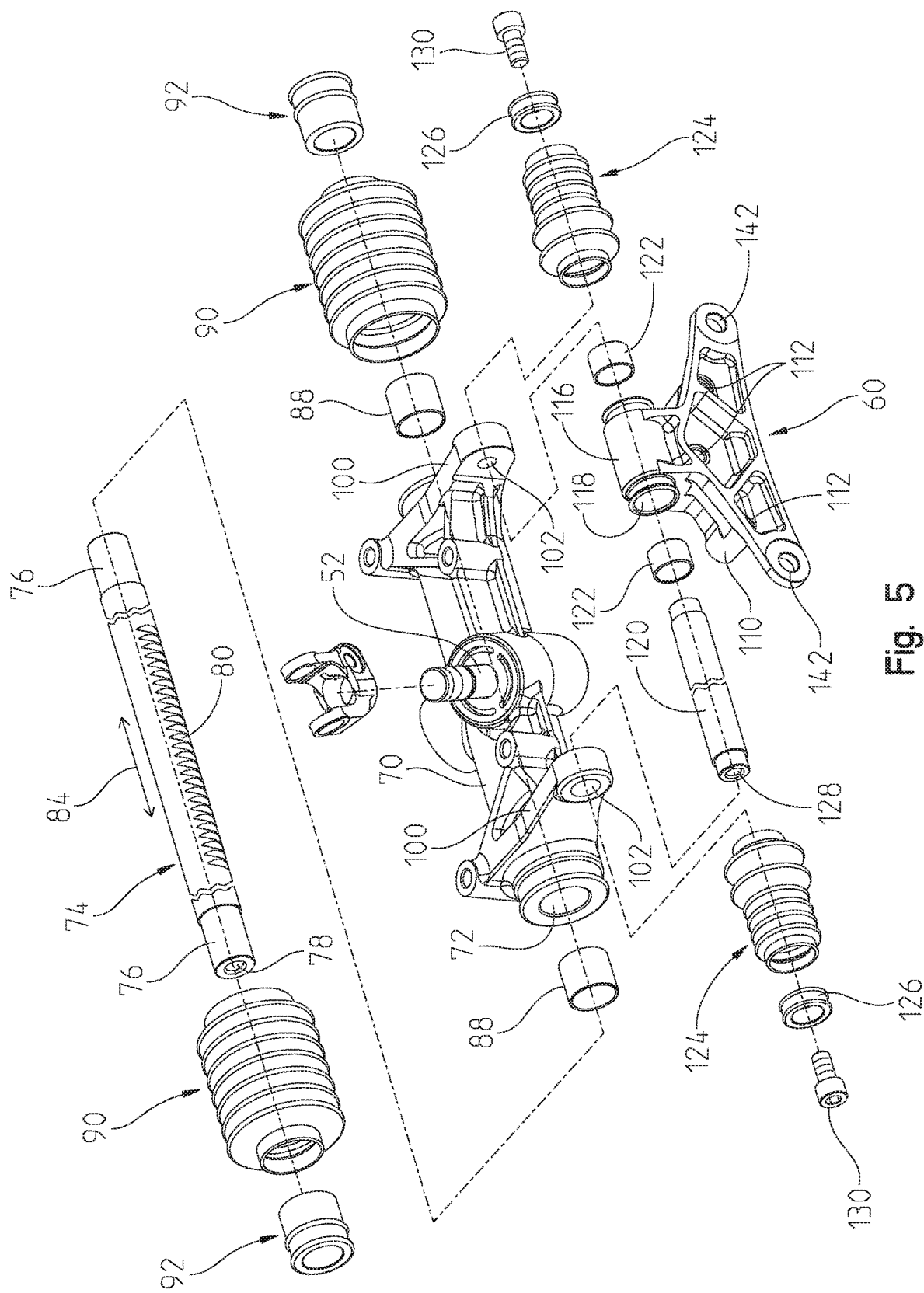

CENTER TAKE OFF RACK AND PINION STEERING SYSTEM

RELATED CASES

This application claims priority to U.S. Provisional Patent Application Ser. No. 62/578,894, filed Oct. 30, 2017, the subject matter of which is incorporated herein by reference.

BACKGROUND

The present application relates to a steering system and more particularly to a center take off rack and pinion system.

While center take off power steering systems are known generally, the present invention provides an improved system for use in the application of powersports vehicles such as ATVs, utility vehicles and snowmobiles.

In an embodiment of the present invention, a center take off rack and pinion steering system comprises a rack housing; a rack gear positioned in the rack housing, the rack gear having first and second ends extending through the housing; a pinion gear coupled to the rack gear to input steering power to the rack gear; a rack yoke coupled to, and extending between, the first and second ends of the rack gear; a yoke support coupled to the rack housing; a yoke support slider coupled to the rack yoke and movable with the rack yoke relative to the yoke support; and tie rod end mounts supported by the rack yoke, the tie rod end mounts positioned laterally intermediate the first and second ends of the rack gear.

In another embodiment of the present invention, a center take off rack and pinion steering system comprises a rack housing; a rack gear positioned in the rack housing, the rack gear having first and second ends extending through the housing; a pinion gear coupled to the rack gear to input steering power to the rack gear; a rack yoke coupled to, and extending between, the first and second ends of the rack gear; a yoke support coupled to the rack housing; a yoke support slider coupled movable relative to the yoke support; and tie rod end mounts supported by the rack yoke, the tie rod end mounts positioned laterally intermediate the first and second ends of the rack gear; and at least one seal sealing the yoke support.

The embodiments of the invention will now be described by way of reference to the drawing figures, where:

BRIEF DESCRIPTION OF THE DRAWINGS

FIG. 5 is an exploded view of the rack and pinion system shown in FIG. 4.

DETAILED DESCRIPTION OF THE DRAWINGS

Figure 1:
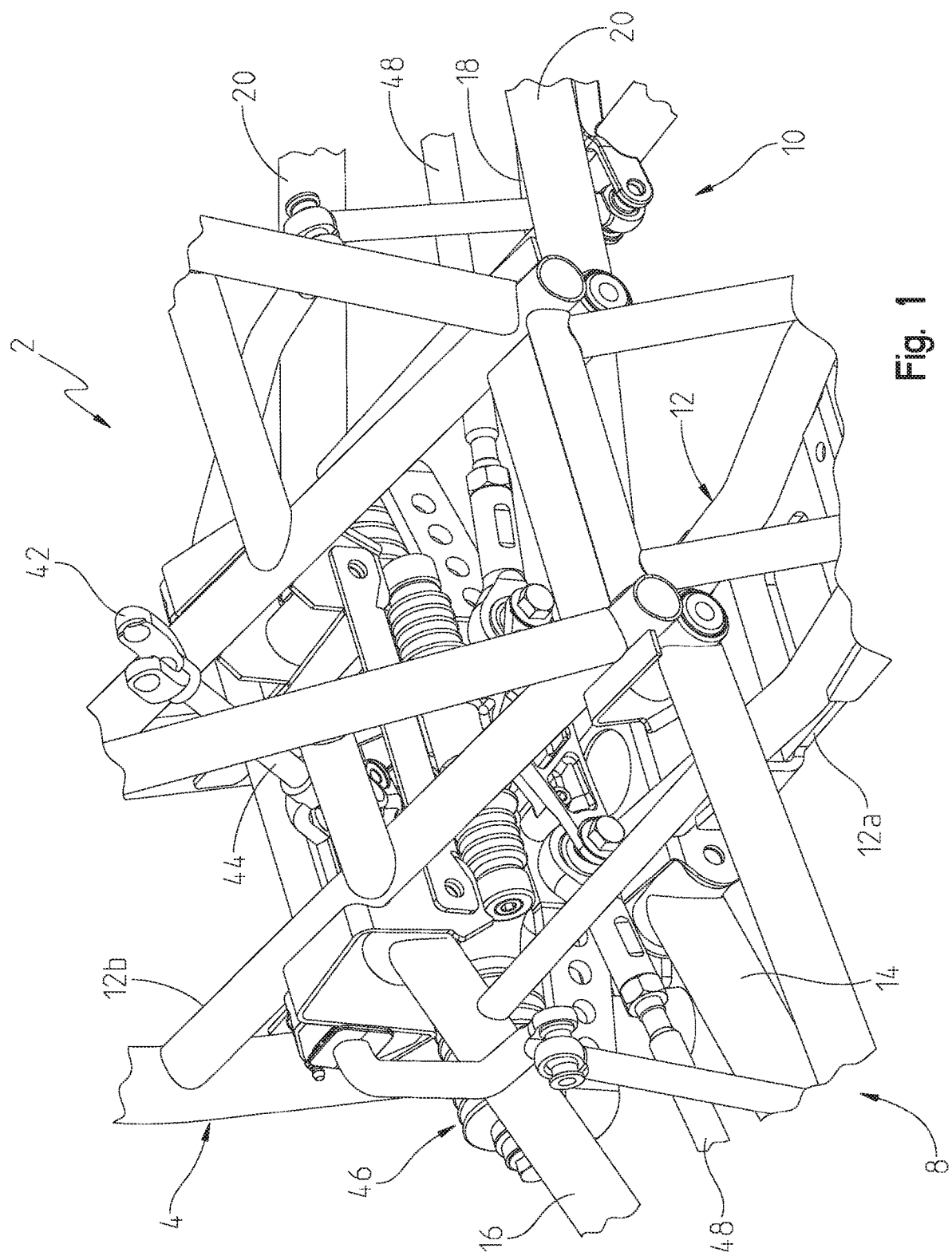
FIG. 1 is an enlarged view of the steering system as shown in FIG. 2.

With reference now to FIG. 1, a front end 2 of a vehicle is shown comprising a frame 4 supported by front ground engaging members, such as wheels. Wheels are shown for example in our U.S. Pat. Nos. 8,122,993, and 8,827,019, the subject matter of which is incorporated herein by reference. Front ground engaging members are coupled to the frame by way of a front left suspension 8 and a front right suspension 10. Frame 4 includes a suspension mount portion at 12 including a lower frame portion 12a and an upper frame portion 12b, where front left suspension 8 and front right suspension 10 are coupled to the suspension mount portion 12. More particularly, the front left suspension 8 includes a lower A-arm at 14 coupled to the lower frame portion 12a and an upper A-arm 16 coupled to the upper frame portion 12b. In a like manner, the front right suspension system 10 includes a lower A-arm 18 coupled to the lower frame portion 12a and an upper A-arm 20 coupled to the upper frame portion 12b. Front shock absorbers couple front left suspension 8, right front suspension system 10 to frame 4, as shown in our U.S. Pat. No. 8,827,019, the subject matter of which incorporated herein by reference.

With reference still to FIG. 1, a steering system would comprise a steering input such as a steering wheel, a steering column through which a steering shaft protrudes and which couples to a steering gear. Preferably, steering gear is an electric power steering system. A representative steering system is shown in our U.S. Pat. Nos. 8,122,993 and 9,623,912, the subject matter of which is incorporated herein by reference. An output 42 couples to steering rod 44 which then couples to rack and pinion steering system 46. Rack and pinion steering system 46 couples to tie rods 48 which in turn couple to ground engaging members for steering purposes. In the present embodiment, rack and pinion steering system 46 is a center take off power steering system.

Figure 2:
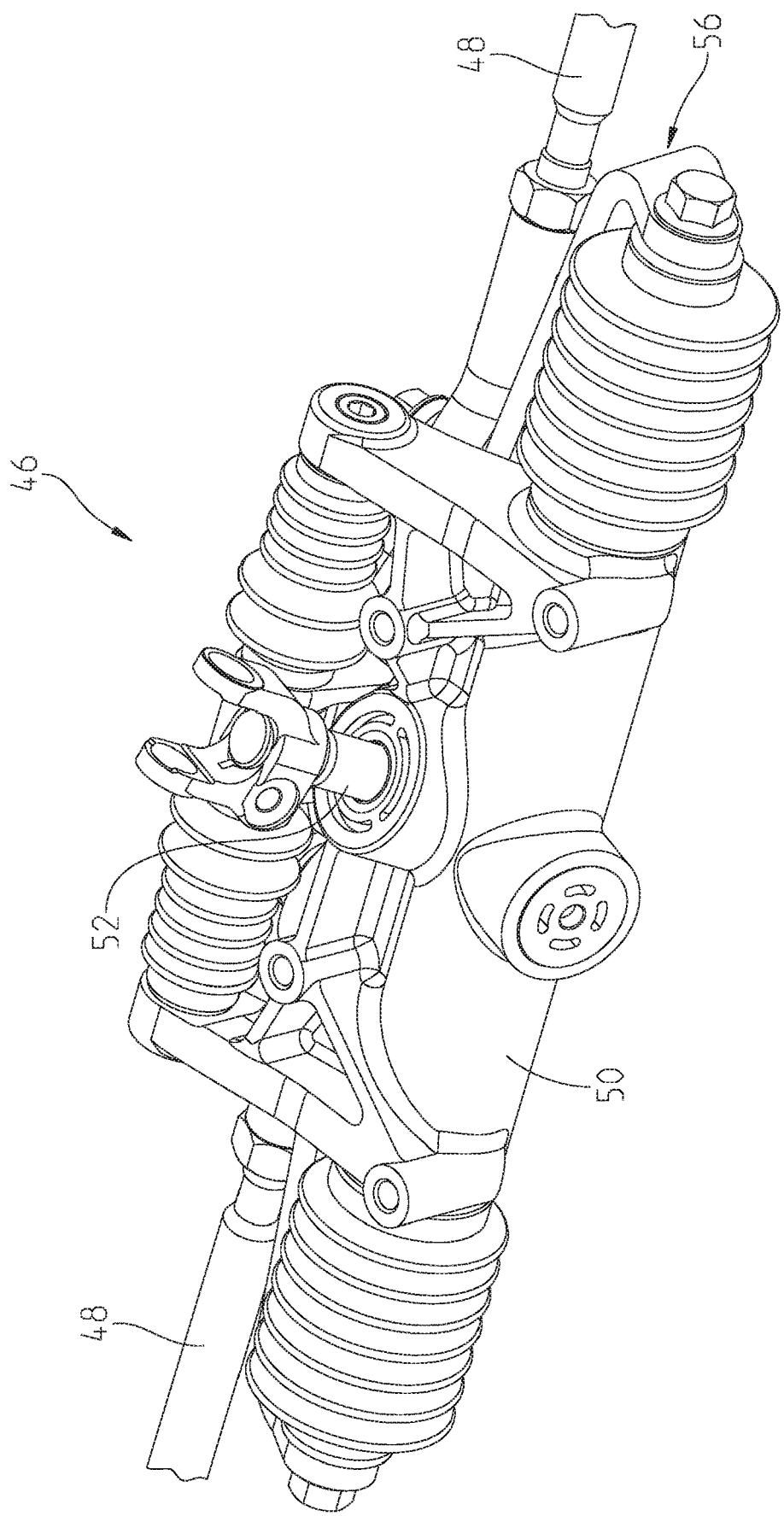
FIG. 2 is front perspective view of the center take off rack and pinion steering gear.
Figure 3:
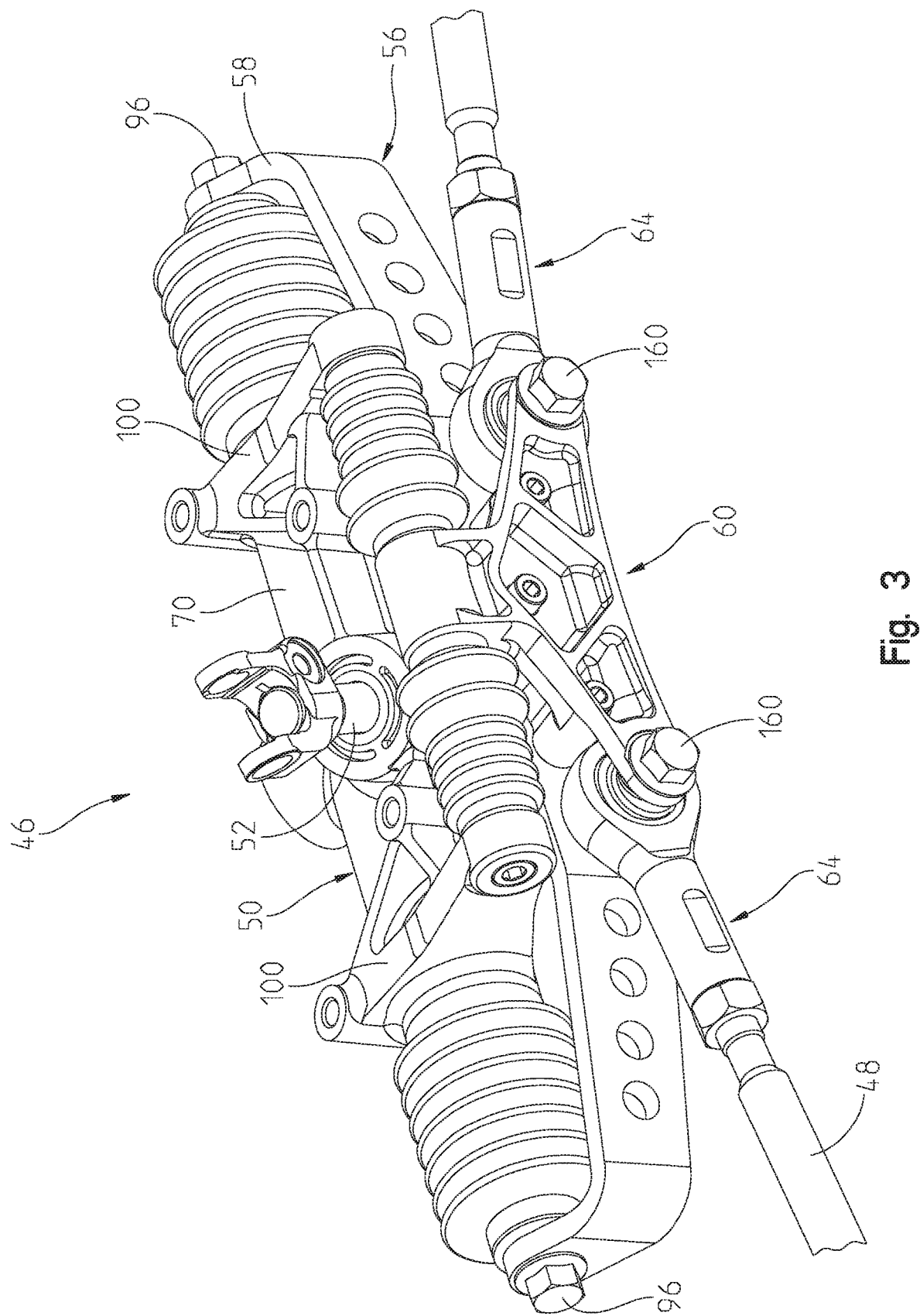
FIG. 3 is a rear perspective view of the center take off steering gear of FIG. 2.

With reference now to FIGS. 2 and 3, center take off rack and pinion system 46 is shown in greater detail. As shown, rack and pinion system 46 comprises a rack housing 50, an input pinion shaft at 52 which receives input from steering rod 44 (FIG. 1) as input from the steering mechanism. Rack and pinion system 46 further includes a rack yoke 56 including arms 58 at ends thereof which couple to rack and pinion mechanism 46 as described herein. A yoke support slider 60 couples to the rack yoke 56 and is movable therewith. Tie rod end mounts 64 couple to yoke support slider 60 such that when yoke support slider moves with rack yoke 56 tie rod ends 48 move to the left or to the right as viewed in FIG. 3.

Figure 4:
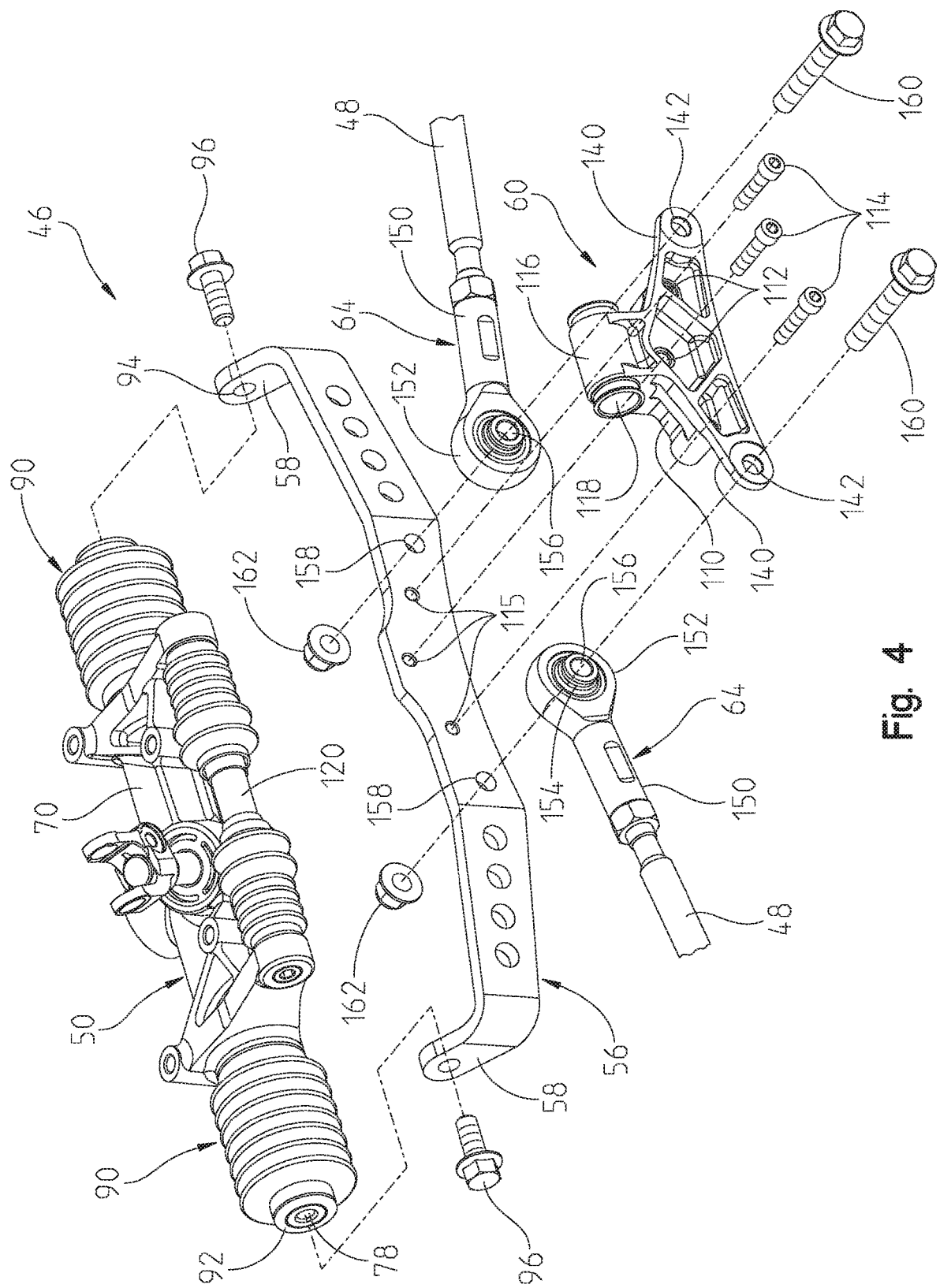
FIG. 4 is an exploded view of the center take off mount exploded away from the rack and pinion steering gear.

With reference now to FIGS. 4 and 5, the details of the center take off rack and pinion system will be described in greater detail. As shown in FIG. 5, the rack and pinion housing 50 includes a body portion 70 having a through opening 72 therethrough which receives rack gear 74. Rack gear 74 includes ends 76 having threaded apertures 78 therein. Rack gear 74 includes a plurality of rack teeth at 80 which correspond to teeth (not shown) on pinion gear 52, such that rotation of pinion gear 52 causes teeth on pinion gear 52 to mesh with rack teeth 80 to move rack gear in the direction of arrow 84 depending on the rotation of pinion gear 52. Slide bearings 88 are positioned within openings 72 which allow rack gear 74 to translate smoothly within opening 72 of rack housing 50. Bellows 90 are positioned at each end of the rack housing 50 and seals 92 are positioned within the bellows 90. As shown best in FIG. 4, as assembled, bellows 90 abuts an end of the rack housing 50 and overlaps ends 76 of rack gear 74. Thus, threaded apertures 78 are accessible through the bellows 90 and seal 92. It should be appreciated that rack gear 74 protrudes through ends of the rack and pinion housing 50 and resides in bellows 90. It should also be appreciated that bellows 90 are expandable and contractible to always cover and seal the rack gear 74. With reference still to FIG. 4, rack yoke 56 includes apertures at 94 which can align with apertures 78 of rack gear 74 whereupon fasteners 96 can mount rack yoke 56 to the rack gear 74 as shown in FIG. 3.

With reference now to FIGS. 4 and 5, rack housing 50 further includes support arms 100 extending outwardly from body 70 and includes apertures at 102. As shown, yoke support slider 60 includes a body portion 110 having three mounting apertures 112. Yoke support slider 60 is coupled to the rack yoke 56 by way of fasteners 114 (FIG. 4) through apertures 112 and into threaded engagement with threaded apertures 115. Yoke support slider 60 further includes a slider portion 116 having an aperture at 118 therethrough (FIG. 4). A yoke support is defined by a slide 120 coupled to arms 100 as described herein. It should be appreciated that slider portion 116 slides along, and is supported by, slide 120. Linear bearings 122 are positioned within aperture 118 and thereafter receive slide 120. Bellows 124 are positioned over ends of the slide 120, and seals 126 are positioned within ends of bellows 124 and over ends of the slide 120. It should be noted that shaft seals could be used in place of bellows 124. Slide 120 includes a threaded aperture at 128 whereupon fasteners 130 are threadibly received in the apertures 128 to maintain the slide in the position shown in FIG. 4, attached to support arms 100. It should be noticed in FIG. 4 that the slide 120 is shown attached to support arms 100 for illustration purposes only, as yoke support slider 60 is not shown positioned on slide 120.

Finally and with reference again to FIG. 4, yoke support slider 60 includes outer bracket arms 140 having apertures at 142. As shown in FIG. 4, tie rod ends 64 include spherical rod ends having a threaded shank portion 150 and a ball joint end 152. Ball joint end 152 includes a spherical ball joint at 154 with apertures at 156. Yoke 56 includes apertures at 158 such that tie rod ends 64 may be positioned between outer bracket arms 140 and rack yoke 56 and fasteners 160 may be received through apertures 142 of bracket arms 140 and apertures 156 of spherical ball joints 154 and into threaded engagement with fasteners 162 to position the spherical rod ends 64 into the position shown in FIG. 5.

Thus as shown, rack yoke 56 is fixed to ends of the rack gear 74 and is movable therewith. Bellows 90 seal ends of the rack gear 74 through its entire travel. The rack yoke 56 is supported by way of yoke support slider 60 sliding on slide 120, and more particularly through aperture 118 (FIG. 4) sliding along slide 120. The rack yoke 56 and slide 120 are sealed by way of seals 126 and bellows 124. Like bellows 90, bellows 124 are expandable and contractible to always cover and seal the slide 120.

It should be appreciated that in prior vehicles, tie rod ends 64 are normally coupled to the ends 76 of the rack gear 74. As apertures 142 of the present embodiment are positioned towards a center of the rack housing 50, tie rods 48 may be longer than prior vehicles requiring less angular movement. More particularly, and as best shown in FIG. 5, the tie rod end mounts (at ball joint 154) are positioned laterally intermediate the first and second ends 76 of the rack gear 74.

It should also be noted that this design allows the tie rod ends to be designed fore-aft and vertically different from the rack gear ends 76, as well as laterally inboard.

What is claimed is:

1. A center take off rack and pinion steering system, comprising:
    a rack housing;
    a rack gear positioned in the rack housing, the rack gear having first and second ends extending through the housing;
    a pinion gear coupled to the rack gear to input steering power to the rack gear;
    a rack yoke coupled to the rack gear and having a first lateral end and a second lateral end, wherein the rack gear extends between the first and second lateral ends of the rack yoke;
    a yoke support coupled to the rack housing;
    a yoke support slider coupled to the rack yoke and movable with the rack yoke relative to the yoke support, the yoke support slider being spaced apart from the rack yoke; and
    tie rod end mounts supported by the rack yoke, the tie rod end mounts positioned at a location laterally inward of the first and second ends of the rack gear.

2. The center take off rack and pinion steering system of claim 1, wherein the rack housing includes support arms extending from the housing and the yoke support is coupled to the support arms.

3. The center take off rack and pinion steering system of claim 2, wherein the support arms extend over the rack yoke.

4. The center take off rack and pinion steering system of claim 3, wherein the yoke support comprises a bar extending between the support arms.

5. The center take off rack and pinion steering system of claim 4, wherein the yoke support slider is slideable along the bar.

6. The center take off rack and pinion steering system of claim 5, further comprising slider bellows positioned between the yoke support slider and the support arms.

7. The center take off rack and pinion steering system of claim 6, wherein the yoke support slider is centrally loaded along the bar when the rack is in a no steer position, and the slider bellows are positioned on both sides of the yoke support slider between the support arms.

8. The center take off rack and pinion steering system of claim 1, wherein the yoke support slider is positioned rearwardly of the rack yoke.

9. The center take off rack and pinion steering system of claim 8, wherein the rack yoke is positioned rearwardly of the rack gear.

10. A center take off rack and pinion steering system, comprising:
    a rack housing;
    a rack gear positioned in the rack housing, the rack gear having first and second ends extending through the housing;
    a pinion gear coupled to the rack gear to input steering power to the rack gear;
    a rack yoke coupled to the rack gear and having a first lateral end, a second lateral end, and a center portion extending continuously between the first and second lateral ends, wherein the rack gear extends between the first and second lateral ends of the rack yoke;
    a yoke support coupled to the rack housing;
    a yoke support slider is movable relative to the yoke support;
    tie rod end mounts supported by the rack yoke, the tie rod end mounts positioned at a location laterally inward of the first and second ends of the rack gear; and
    at least one seal sealing the first and second ends of the rack.

11. The center take off rack and pinion steering system of claim 10, wherein the yoke support slider is coupled to the rack yoke and movable with the rack yoke relative to the yoke support.

12. The center take off rack and pinion steering system of claim 11, wherein the rack housing includes support arms extending from the housing and the yoke support is coupled to the support arms.

13. The center take off rack and pinion steering system of claim 12, wherein the support arms extend over the rack yoke.

14. The center take off rack and pinion steering system of claim 13, wherein the yoke support comprises a bar extending between the support arms.

15. The center take off rack and pinion steering system of claim 14, wherein the yoke support slider is slideable along the bar.

16. The center take off rack and pinion steering system of claim 15, further comprising slider bellows positioned between the yoke support slider and the support arms.

17. The center take off rack and pinion steering system of claim 16, wherein the yoke support slider is centrally loaded along the bar when the rack is in a no steer position, and the slider bellows are positioned on both sides of the yoke support slider between the support arms.

\* \* \* \* \*